United States Patent [19]
Konig

[11] Patent Number: 5,247,308
[45] Date of Patent: Sep. 21, 1993

[54] DETECTION AND CHARACTERIZATION OF LPI SIGNALS

[75] Inventor: Charles E. Konig, Staten Island, N.Y.

[73] Assignee: The United States of America as represented by the Secretary of the Army, Washington, D.C.

[21] Appl. No.: 22,255

[22] Filed: Feb. 24, 1993

[51] Int. Cl.$^5$ .............................................. G01S 7/292
[52] U.S. Cl. .................................... 342/202; 329/304; 342/194
[58] Field of Search ..................... 342/202, 21, 194; 329/304

[56] References Cited

U.S. PATENT DOCUMENTS

| | | | |
|---|---|---|---|
| 4,443,801 | 4/1984 | Klose et al. | 342/442 |
| 4,647,863 | 3/1987 | Skudera, Jr. et al. | 329/112 |
| 4,860,318 | 8/1989 | Shaw et al. | 375/82 |
| 4,965,581 | 10/1990 | Skudera, Jr. et al. | 342/19 |
| 5,001,723 | 3/1991 | Kerr | 375/1 |
| 5,185,765 | 2/1993 | Walker | 375/22 |

Primary Examiner—John B. Sotomayor
Attorney, Agent, or Firm—Michael Zelenka; William H. Anderson

[57] ABSTRACT

BPSK signals are detected by receiving an input signal containing the BPSK signals to be detected, by means of a compressive receiver; applying the receiver output to a 90° phase shifter which outputs a phase-shifted signal; applying the phase-shifted signal to a delay line which applies a further phase shift of −180° to the phase shifted signal; and detecting the relative phase of the non-phase-shifted signal from the compressive receiver and the phase-shifted signal from the delay line by applying those signals to respective input ports of a phase detector, the output of the phase detector being indicative of detection of a BPSK signal. Advantageously, zero-crossings of the output signal of the phase detector are detected, and the output of the zero-crossing detector is low-pass-filtered.

4 Claims, 1 Drawing Sheet

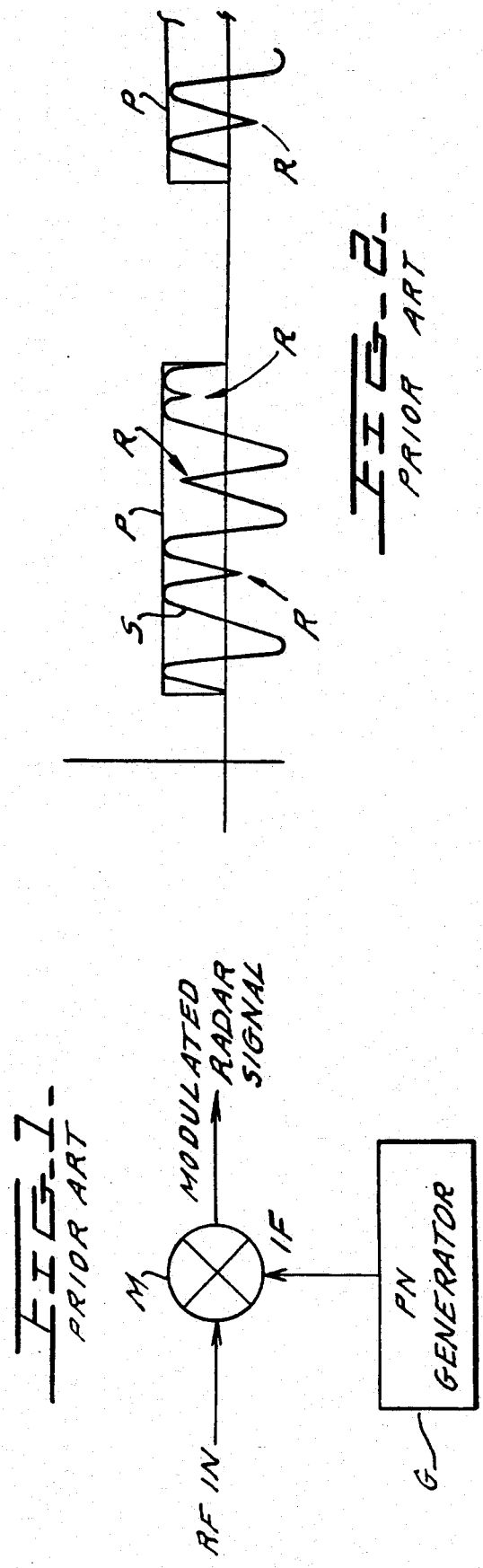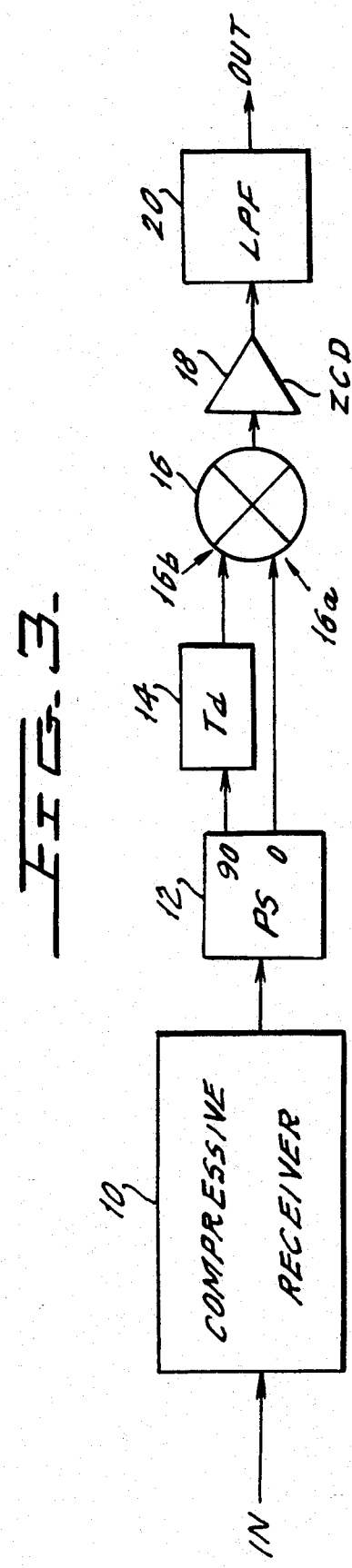

DETECTION AND CHARACTERIZATION OF LPI SIGNALS

STATEMENT OF GOVERNMENT INTEREST

The invention described herein may be manufactured, used and licensed by or for the Government for governmental purposes without the payment to me of any royalties.

BACKGROUND OF THE INVENTION

1. Field of the Invention

This invention relates to methods and apparatus for detecting signals below a noise floor or weak signals around a detection threshold, particularly signals from quiet radars and direct sequence radar modulations, otherwise known as low-probability-of-intercept (LPI) radars. Many of these radars employ pulse compression and power management to avoid ESM (Electronic Support Measures) detection.

More particularly, the present invention relates to circuitry which can detect, demodulate and characterize bipolar phase shift-keyed (BPSK) signals with much less complicated circuitry than that previously used.

2. Background Art

Low probability of intercept radars try to do what their name implies, namely reduce the available peak power of the radar signal without corrupting the target detection process. As a target approaches closer to the LPI radar, the radar processor dynamically reduces the power on the target to keep the signal-to noise ratio (S/N) of the detection power constant. A classic technique is to use pulse compression, where the energy is spread out but recovered by the time bandwidth of the receiver. Sometimes binary phase shift keying is used to randomly change the phase within a long pulse for added protection from electronic countermeasures (ECM).

Present LPI demodulation techniques employ complicated synchronizing techniques and carrier regeneration circuits to demodulate the baseband. Also phase-locked-loop circuits are needed to recover the carrier frequency.

FIG. 1 is a simplified block diagram showing the basic elements of a BPSK transmitter. An RF carrier is input to a modulator M. A pseudonoise signal is generated by a PN generator G, which may be a conventional SAW-type PN generator. The PN signal is a string such as 01101110... and is supplied to an IF input of the modulator M. An example of an output signal is shown in FIG. 2. As seen therein, a long radar pulse P is composed of a bipolar RF signal S having several phase reversals R which are responsive to the modulating PN signal.

U.S. Pat. No. 4,647,863 dated Mar. 3, 1987 to Skudera and Konig (incorporated by reference) illustrates means for detection of PSK signals. The present disclosure will apply a technique disclosed in the '863 patent for detection and demodulation of complex LPI radar modulations, such as BPSK signals.

According to a method of detection disclosed in the '863 patent, to detect BPSK, a synchronous detector is used with a delay corresponding to the highest chip rate, i.e., the frequency of the BPSK signal. For a pseudo-random or pseudo-noise (PN) sequence, one half of the highest chip rate is used. Usually this technique is used with IFM (Instantaneous Frequency Measurement) receivers, also known as DFD (Digital Frequency Discriminator) receivers, and requires very high signal-to-noise ratios.

See also U.S. Pat. No. 4,443,801 to Klose and Skudera, and U.S. Pat. No. 4,965,581 to Skudera and Albert, both incorporated by reference, which are of background interest.

SUMMARY OF THE INVENTION

To avoid the above-mentioned disadvantages, the present technique uses a delay line following a compressive receiver. The compressive receiver is used for detection and can be used with very low S/N ratio signals, especially LPI modulations. To detect a BPSK signal with this type of receiver, a chirped, detected signal is received and stored in consecutive frequency cells and a chirp flag is activated when the cells are full. Logic is then employed to find the center frequency by averaging over all detected cell counts. Also, the number of transitions is detected in order to yield the chip rate.

In more detail, the theory behind BPSK detection according to the invention is as follows. A bipolar-phase-shift-keyed signal is amplified and split into two paths. One path is delayed 180°. These two signals are fed into a quadrature IR mixer (phase correlator). This circuit produces two outputs. Each output corresponds to the phase reversals produced by the generating PN generator in the transmitter. When the voltages are detected they are fed into a zero-crossing detector which produces the modulating zero-and-one patterns.

The values of the delay t must be $\frac{1}{2}$ times the maximum chip rate, in order to detect the highest rate BPSK signal, also referred to as phase modulation on pulse (PMOP).

Other features and advantages of the present invention will become apparent from the following description of the invention which refers to the accompanying drawings.

BRIEF DESCRIPTION OF THE DRAWINGS

FIG. 1 is a simplified block diagram showing the elements of a BPSK transmitter;

FIG. 2 shows an example of an output signal of the transmitter of FIG. 1; and

FIG. 3 shows a detection circuit according to an embodiment of the invention.

DETAILED DESCRIPTION OF AN EMBODIMENT OF THE INVENTION

An embodiment of the invention is shown in FIG. 3. The input signal from a compressive receiver 10 is split into two paths by a 90° phase shifter 12, one passing through a delay network 14 and the other applied directly to the reference port 16a of a phase comparator 16. The delay line introduces a constant delay of t seconds over the bandwidth of interest. The delay t is equal to a phase shift of −180° at the center frequency (Wc).

When the phase frequency characteristic is linear, t becomes the group delay Dg of the network. Phase linearity over the IF bandwidth is essential and is easily achieved by using coaxial delay lines or 180° hybrids.

The output of the delay line 14 is then applied directly to the unknown port 16b of the phase correlator 16. The delay line with its linear phase characteristics shifts the phase (Vt) which is directly proportional to the instantaneous IF frequency V(fm).

An output port 16c applies the output of the phase comparator 16 to a zero-crossing detector 18, whose output is then filtered by a low-pass filter 20.

When the input radar signal is not modulated, the inputs to the IF ports 16a, 16b are two sinusoids in quadrature and their product is therefore zero. But in practice the mixing action produces a sinusoidal output due to the phase and the amplitude mismatch of the two channels. As the modulation is applied, the known and unknown ports deviate from quadrature by an amount delta w(t), where delta w(t) is the instantaneous deviation from the carrier frequency. It is this deviation from quadrature that determines the sensitivity of the detector.

The output of the phase comparator 16 contains two components, one at 2Wc and the other at baseband, corresponding to the modulating signal. However, the information signal delta w(t) is now a sine function because the phase correlator is a phase detector with a transfer function that is sinusoidal. The delay line changes the instantaneous frequency into a corresponding phase deviation before applying it to a phase detector. The information signal is now proportional to the phase difference between the unknown port 16b and the reference port 16a.

The two phase correlator outputs are:

$$V(t)1 = KA/2 \sin \Delta\omega(\tau) \quad (1)$$

$$V(t)2 = KA/2 \cos \Delta\omega(\tau) \quad (2)$$

Therefore, over a range of phase deviations:

$$\sin \Delta\omega(\tau) = \Delta\omega(\tau) \quad (3)$$

$$\cos \Delta\omega(\tau) = \Delta\omega(\tau) \quad (4)$$

And, $$V(t)1 = KA/2 \, \Delta\omega(\tau) \quad (5)$$

$$V(t)2 = KA/2 \, \Delta\omega(\tau) \quad (6)$$

The resultant equations are the detected outputs from the discrimination process.

The output pulse contains the phase reversals of the BPSK signal. For a 20 MHZ BPSK signal, a minimum 50 ns pulse width or a phase transition every 100 ns would occur for an OOK (on-off keyed) signal. Therefore, the IF bandwidth of the compressive channel would have to be the same as the bandwidth of the PSK signal, namely 20 MHZ. But if this 20 MHZ phase-modulated signal enters a compressive receiver with a dispersive bandwidth of 20 MHZ, then a 50 ns pulse output will occur. That is $$\frac{1}{20 \times 10^6} = 50 \times 10^{-9}$$

Ergo, no phase transitions will be contained in this short pulse. Therefore, it is necessary to widen the scan time of the surface acoustic wave (SAW) delay line contained in the compressive receiver, so the output pulse will contain all or most of the phase reversals.

For example, if $2^n$ bits are used to generate the BPSK sequence, n=4, so 16 pulses or a minimum of 8 phase reversals would occur. For a 20 MHZ clock rate, this implies that an 800 ns pulse will be required. So for full compression gain, an 800 ns output pulse, or 1.25 MHZ compression line, would be required. If a 20 MHZ PMOP (Phase Modulation on Pulse) signal enters the compression line a 12 db loss in signal strength will occur.

As for the length of compression line contained in the compressive receiver, one has a design trade-off to make; either the detection of wideband with chirp signals, or the detection of a large number of signals in the IF pass band.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A method of detecting BPSK signals, comprising the steps of:
   receiving an input signal containing the BPSK signals to be detected, by means of a compressive receiver;
   applying the receiver output to a 90° phase shifter which outputs a phase-shifted signal;
   applying the phase-shifted signal to a delay line which applies a further phase shift of −180° to the phase shifted signal; and
   detecting the relative phase of the non-phase-shifted signal from the compressive receiver and the phase-shifted signal from the delay line by applying those signals to respective input ports of a phase detector, the output of the phase detector being indicative of detection of a BPSK signal.

2. The method of claim 1, further comprising the steps of detecting zero-crossings of the output signal of the phase detector, and low-pass filtering the output of the zero-crossing detector to obtain the output which is indicative of detection of the BPSK signal.

3. A circuit for detecting BPSK signals, comprising:
   a compressive receiver for receiving an input signal containing the BPSK signals to be detected;
   a 90° phase shifter which receives the receiver output and outputs a phase-shifted signal;
   a delay line which receives the phase-shifted signal and applies a further phase shift of −180° to the phase-shifted signal; and
   a phase detector for detecting the relative phase of the non-phase-shifted signal from the compressive receiver and the phase-shifted signal from the delay line, those signals being received by respective input ports of said phase detector, the output of the phase detector being indicative of detection of the BPSK signal.

4. The circuit of claim 3, further comprising means for detecting zero-crossings of the output signal of the phase detector, and means for low-pass-filtering the output of the zero-crossing detecting means.

* * * * *